March 4, 1941.　　　J. M. DRISCOLL　　　2,233,863
FISHHOOK
Filed Jan. 18, 1939

Inventor:
James M. Driscoll.
By: Brayton Richards
Attorney.

Patented Mar. 4, 1941

2,233,863

UNITED STATES PATENT OFFICE 2,233,863

FISHHOOK

James M. Driscoll, Portland, Oreg.

Application January 18, 1939, Serial No. 251,511

2 Claims. (Cl. 43—27)

The invention relates to improvements in fishhooks and has for its primary object the provision of a fishhook of improved construction and highly efficient in use.

Other objects will appear hereinafter.

The invention consists in the combinations and arrangements of parts hereinafter described and claimed.

Figure 1:
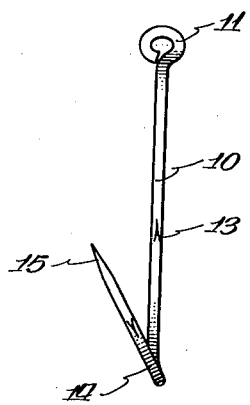
Figure 2:
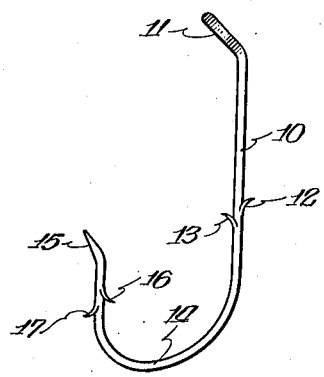
Figure 3:
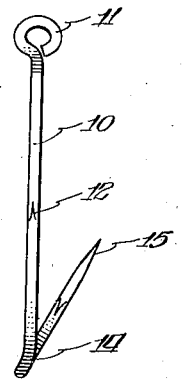

The invention will be best understood by reference to the accompanying drawing forming a part of this specification and in which Fig. 1 is a front view of a fishhook embodying the invention;

Fig. 2 a side view thereof;

Fig. 3 a rear view thereof; and

Figure 4:
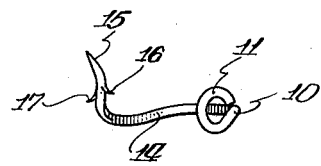

Fig. 4 a top plan view thereof.

The embodiment of the invention illustrated in the drawing comprises a fishhook having a shank 10 and an inwardly inclined eye 11. The shank 10 is provided with bars 12 and 13 cut from the material thereof and extending, respectively, outwardly and inwardly out of transverse registration with each other, as best shown in Fig. 2. The hook is also provided with a throat 14 and a forwardly bent point 15. Barbs 16 and 17 are formed as shown, respectively, on the inner and outer sides of the point of the throat of the hook adjacent its point, said barbs being cut from the material of the hook and projecting from the inward and outward sides thereof out of transverse registration with each other, as best shown in Fig. 2.

By this arrangement, the barbs may be formed from the material of the throat of the hook with a minimum of weakening thereof and a maximum of security for the fish hooked thereon.

While I have illustrated and described the preferred form of construction for carrying the invention into effect, this is capable of variation and modification without departing from the spirit of the invention. I therefore do not wish to be limited to the precise details disclosed, but desire to avail myself of such variations and modifications as fall within the scope of the appended claims.

I claim.

1. In a fishhook, including a shank, a point portion and a throat connecting said shank and point portion; said entire point portion being substantially straight and forwardly inclined at an angle to the adjoining portion of said throat, and barbs projecting from opposite sides of said adjoining portion of said throat below and in spaced relation with said point.

2. In a fishhook, including a shank, a point portion and a substantially U-shaped throat, having at least one substantially straight leg connecting said shank and point portion; said point portion being barbless and comprising an elongated forwardly bent continuation of said straight leg of said throat, and barbs projecting from opposite sides of said leg a substantial distance below its juncture with said point portion.

JAMES M. DRISCOLL.